US011509357B2

(12) United States Patent
Miyamoto et al.

(10) Patent No.: US 11,509,357 B2
(45) Date of Patent: Nov. 22, 2022

(54) RELAY APPARATUS AND RELAY METHOD

(71) Applicant: Nippon Telegraph and Telephone Corporation, Tokyo (JP)

(72) Inventors: Kenji Miyamoto, Tokyo (JP); Keita Takahashi, Tokyo (JP); Hirofumi Yamamoto, Tokyo (JP); Noriyuki Ota, Tokyo (JP); Jun Terada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/261,814

(22) PCT Filed: Jul. 23, 2019

(86) PCT No.: PCT/JP2019/028840
§ 371 (c)(1),
(2) Date: Jan. 20, 2021

(87) PCT Pub. No.: WO2020/022330
PCT Pub. Date: Jan. 30, 2020

(65) Prior Publication Data
US 2021/0344381 A1    Nov. 4, 2021

(30) Foreign Application Priority Data

Jul. 24, 2018    (JP) .............................. JP2018-138356

(51) Int. Cl.
*H04B 7/026* (2017.01)
*H04B 7/155* (2006.01)
(Continued)

(52) U.S. Cl.
CPC ......... *H04B 7/026* (2013.01); *H04B 7/15542* (2013.01); *H04W 88/08* (2013.01); *H04W 92/04* (2013.01)

(58) Field of Classification Search
CPC ... H04B 7/026; H04B 7/15542; H04W 88/08; H04W 92/04
See application file for complete search history.

(56) References Cited

U.S. PATENT DOCUMENTS

2012/0307713 A1   12/2012   Watanabe et al.
2014/0334417 A1   11/2014   Aminaka et al.
(Continued)

FOREIGN PATENT DOCUMENTS

JP     2011-130179        6/2011
WO    WO 2013/076901     5/2013
WO    WO 2016/002166     1/2016

OTHER PUBLICATIONS

Anil et al., "5G Radio Access Network Standardization Trend," NTT DOCOMO Technical Journal, Oct. 2017, 25(3):33-43.
(Continued)

*Primary Examiner* — Kibrom T Hailu
*Assistant Examiner* — Nizam U Ahmed
(74) *Attorney, Agent, or Firm* — Fish & Richardson P.C.

(57) ABSTRACT

A relay device for relaying communications between a plurality of radio devices that perform radio communications with a terminal and a radio control apparatus that controls the plurality of radio devices, the relay device including a plurality of signal combiners that are each provided for one of functional splitting points between the plurality of radio devices and the radio control apparatus, and are each configured to convert signal data transmitted from one of the plurality of radio devices based on a signal format in accordance with the one of the functional splitting points, and transmit the converted signal data to the radio control apparatus, and a signal switcher configured to output the signal data transmitted from the one of the plurality of radio devices, to one of the plurality of signal combiners
(Continued)

supporting one of the functional splitting points that corresponds to the one of the plurality of radio devices.

12 Claims, 4 Drawing Sheets

(51) Int. Cl.
*H04W 88/08* (2009.01)
*H04W 92/04* (2009.01)

(56) References Cited

U.S. PATENT DOCUMENTS

| | | | |
|---|---|---|---|
| 2017/0156142 A1 | 6/2017 | Sato et al. | |
| 2017/0294955 A1* | 10/2017 | Tomioka | H04W 56/004 |
| 2019/0174391 A1* | 6/2019 | Ode | H04W 76/27 |

OTHER PUBLICATIONS

Masahiro et al., "Development of base station equipment for introduction of 3.5 GHz band TD-LTE," NTT DOCOMO Technical Journal, Jul. 2016, 24(2):8-13.

* cited by examiner

RELAY APPARATUS AND RELAY METHOD

CROSS-REFERENCE TO RELATED APPLICATIONS

This application is a National Stage application under 35 U.S.C. § 371 of International Application No. PCT/JP2019/028840, having an International Filing Date of Jul. 23, 2019, which claims priority to Japanese Application Serial No. 2018-138356, filed on Jul. 24, 2018. The disclosure of the prior application is considered part of the disclosure of this application, and is incorporated in its entirety into this application

TECHNICAL FIELD

The present invention relates to a relay apparatus and a relay method.

BACKGROUND ART

Radio communication systems, mobile communication systems in particular, have been progressively adopting a configuration for a distributed antenna system, in which a plurality of radio devices are accommodated as a single cell (service area) in a single radio control apparatus. For example, Non Patent Literature 1 describes a configuration for the distributed antenna system as illustrated in FIG. 3. Specifically, a relay device 50 (relay apparatus) known as Fronthaul Multiplexer (FHM) is provided between one radio control apparatus 60 and a plurality of radio devices 70. In a link between the radio control apparatus 60 and the radio device 70, an interface signal known as Common Public Radio Interface (CPRI) is exchanged. A signal distribution unit 51 of the relay device 50 copies a CPRI downlink signal by the number of radio devices 70 and distributes them to the radio devices 70. In addition, a signal combination unit 52 of the relay device 50 combines CPRI uplink signals received from the radio devices 70. With the relay device having the functions described above, a plurality of cells can be provided by one radio control apparatus. The distributed antenna system not only includes the system using the relay device that distributes/combines the CPRI signals, but also includes a system using a relay device that distributes/combines Radio Frequency (RF) signals generated with the entire processing on radio signals completed.

There is an issue where the implementation of future mobile communication systems include a large amount of data transmitted by the use of CPRI signals for quantizing and transmitting IQ data with a radio signal waveform between the radio control apparatus and the radio devices. In view of this, a technique of redefining functional split between the radio control apparatus and the radio devices is under study for reducing the amount of data transmitted (see, for example, Non Patent Literature 2). There are a plurality of candidates for a functional splitting point for redefining the functional split.

FIG. 4 illustrates an example of the functional splitting points. The radio device and the radio control apparatus are composed of a Packet Data Convergence Protocol (PDCP) layer, a Radio Link Control (RLC) layer, a Media Access Control (MAC) layer, and a PHY (Physical) layer. Furthermore, the functions in the PHY layer mainly include a coding/decoding function, a modulation/demodulation function, a Multiple-Input and Multiple-Output (MIMO) processing function, an Orthogonal Frequency Division Multiplexing (OFDM) processing function, and an RF transmission and reception function. For example, a functional splitting point (a) in FIG. 4 is a functional splitting point known as Higher Layer Split (HLS). When the functional split is implemented at the HLS, the function of the PDCP layer is assigned to the radio control apparatus, and the functions at and below the RLC layer are assigned to the radio device. Functional splitting points (b), (c), (d), and (e) in FIG. 4 are functional splitting points known as Lower Layer Split (LLS). A functional splitting point (f) in FIG. 4 is a related-art functional splitting point for CPRI. A functional splitting point (g) in FIG. 4 is a functional splitting point employed in a case where the RF signal generated with the entire radio signal processing completed is transmitted between the radio control apparatus and the radio devices.

The format of the signal data transmitted between the radio control apparatus and the radio devices varies depending on which of the functional splitting points is used. Thus, the transmitted data amount and the cooperation performance between the radio devices vary depending on which of the functional splitting point is used. When the functional splitting point is (a) or (b) in FIG. 4, the format of the signal data transmitted between the radio control apparatus and the radio device is bit data, typically an Ethernet (trade name) frame. When the functional splitting point is (c) in FIG. 4, the format of the signal data in uplink is data on likelihood of the bit data being a value "0" or "1" (hereinafter, referred to as "likelihood data"). When the functional splitting point is (d) or (e) in FIG. 4, the format of the signal data is IQ data in the frequency domain. When the functional splitting point is (f) in FIG. 4, the format of the signal data is IQ data in the time domain. When the functional splitting point is (g) in FIG. 4, the format of the signal data is an RF signal.

CITATION LIST

Non Patent Literature

Non Patent Literature 1: Masahiro Fujii et al., "Base-Station Equipment with the Aim of Introducing 3.5-GHz band TD-LTE". NTT DOCOMO Technical Journal, Vol. 24, No. 2, July 2016

Non Patent Literature 2: Anil Umesh et al., "5G Radio Access Network Standardization Trends", NTT DOCOMO Technical journal, Vol. 25, No. 3, October 2017

SUMMARY OF THE INVENTION

Technical Problem

The relay devices in the related-art distributed antenna systems can only distribute/combine CPRI signals or RF signals (that is, can only distribute/combine signals with the functional splitting point being (f) or (g) in FIG. 4). Thus, there is an issue that the relay devices in the related-art distributed antenna systems cannot distribute/combine signals transmitted between the radio control apparatus and the radio devices with new functional splitting points (that is, the functional splitting points (a) to (e) in FIG. 4 for example) to be used as a result of redefinition of the functional split.

Moreover, of the relay devices in the related-art distributed antenna systems, the relay device that distributes/combines the CPRI signals and the relay device that distributes/combines the RF signals are configured as separate devices, for example. Thus, a plurality of relay devices need to be prepared in advance for different types of functional split, or the relay device needs to be replaced in accordance with the functional split. As described above, the related-art technique requires the use of a plurality of relay devices, resulting in a large amount of cost for equipment related to operation of the relay devices or load related to replacement work for the relay device.

In view of the above, an object of the present invention is to provide a technique enabling a single device to distribute/combine signal data with a signal format corresponding to functional split between a radio control apparatus and a radio device.

Means for Solving the Problem

One aspect of the present invention is a relay device for relaying communications between a plurality of radio devices that perform radio communications with a terminal and a radio control apparatus that controls the plurality of radio devices, the relay device including a plurality of signal combination units that are each provided for one of functional splitting points between the plurality of radio devices and the radio control apparatus, and are each configured to convert signal data transmitted from one of the plurality of radio devices based on a signal format in accordance with the one of the functional splitting points, and transmit the converted signal data to the radio control apparatus, and a signal switching unit configured to output the signal data transmitted from the one of the plurality of radio devices, to one of the plurality of signal combination units supporting one of the functional splitting points that corresponds to the one of the plurality of radio devices.

One aspect of the present invention is a relay device for relaying communications between a plurality of radio devices that perform radio communications with a terminal and a radio control apparatus that controls the plurality of radio devices, the relay device including a plurality of signal combination units that are each provided for one of functional splitting points between the plurality of radio devices and the radio control apparatus, and are each configured to convert signal data transmitted from one of the plurality of radio devices based on a signal format in accordance with the one of the functional splitting points and transmit the converted signal data to the radio control apparatus, and a signal switching unit configured to output a plurality of pieces of the signal data transmitted from the plurality of radio devices respectively, to the plurality of signal combination units supporting the functional splitting points that correspond to the plurality of radio devices that transmitted the signal data respectively.

One aspect of the present invention is the relay device described above, in which the converted signal data is first signal data obtained by adding the plurality of pieces of the signal data, second signal data obtained by selecting one of the plurality of pieces of the signal data, or third signal data indicating a signal transmitted from the terminal detected in accordance with the plurality of pieces of the signal data.

One aspect of the present invention is the relay device described above, in which the second signal data is signal data selected in accordance with control information included in signals transmitted from the plurality of radio devices.

One aspect of the present invention is the relay device described above, in which the second signal data is signal data selected in accordance with a control signal transmitted and received between the radio devices and the radio control apparatus.

One aspect of the present invention is a relay device for relaying communications between a plurality of radio devices that perform radio communications with a terminal and a radio control apparatus that controls the radio devices, the relay device including a signal distribution unit configured to copy signal data transmitted from the radio control apparatus, and transmit the copied signal data to only a target radio device of the plurality of the radio devices in accordance with a functional splitting point.

One aspect of the present invention is a computer-implemented relay method for relaying communications between a plurality of radio devices that perform radio communications with a terminal and a radio control apparatus that controls the plurality of radio devices, the method including a plurality of signal combination steps, each performed for one of functional splitting points between the plurality of radio devices and the radio control apparatus, of converting signal data transmitted from one of the plurality of radio devices based on a signal format in accordance with the one of the functional splitting points, and transmitting the converted signal data to the radio control apparatus, and a signal switching step of implementing one of the plurality of signal combination steps corresponding to one of the functional splitting points that corresponds to the one of the plurality of radio devices to process the signal data transmitted from the one of the plurality of radio device.

One aspect of the present invention is a computer-implemented relay method for relaying communications between a plurality of radio devices that perform radio communications with a terminal and a radio control apparatus that controls the plurality of radio devices, the method including a plurality of signal combination steps, each performed for one of functional splitting points between the plurality of radio devices and the radio control apparatus, of each converting signal data transmitted from one of the plurality of radio devices based on a signal format in accordance with the one of the functional splitting points, and transmitting the converted signal data to the radio control apparatus, and a signal switching step of implementing the plurality of signal combination steps corresponding to the functional splitting points that correspond to the plurality of radio devices to process a plurality of pieces of the signal data transmitted from the plurality of radio devices that transmitted the signal data respectively.

Effects of the Invention

The present invention enables a single device to distribute/combine signal data with a signal format corresponding to functional split between a radio control apparatus and a radio device.

DESCRIPTION OF EMBODIMENT

Embodiment

Hereinafter, an embodiment of the present invention will be described with reference to the drawings.

Configuration of Distributed Antenna System

Figure 1:
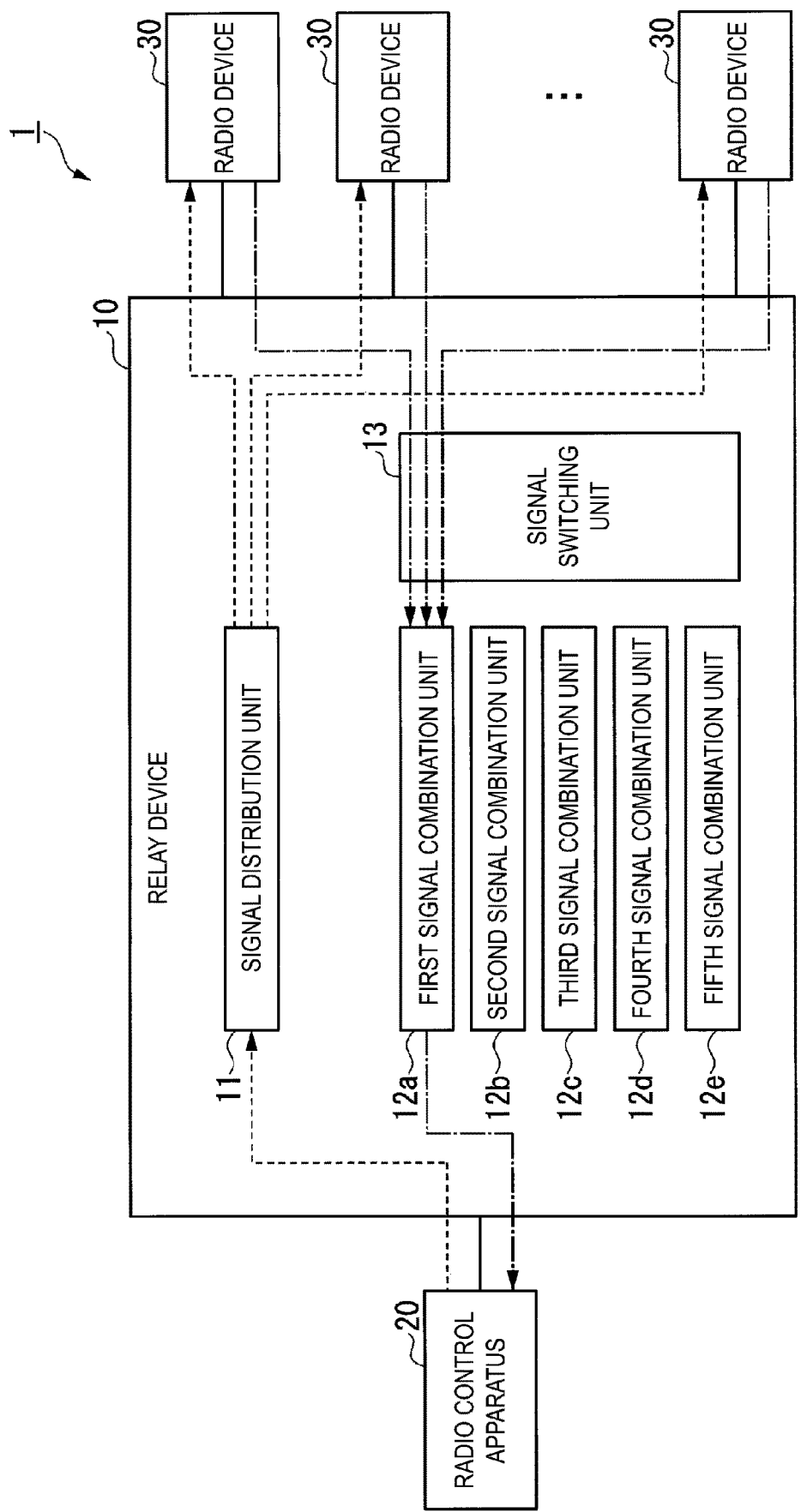
FIG. 1 is a diagram illustrating a configuration of a distributed antenna system 1 according to an embodiment of the present invention.

FIG. 1 is a diagram illustrating a configuration of a distributed antenna system 1 according to an embodiment of the present invention. The distributed antenna system 1 is a system in which a plurality of radio devices 30 that perform radio communications with a terminal are accommodated in one radio control apparatus 20 as a single cell (service area). As illustrated in FIG. 1, the distributed antenna system 1 is configured to include a relay device 10 (relay apparatus), a radio control apparatus 20, and the plurality of radio devices 30.

Configuration of Relay Device

As illustrated in FIG. 1, the relay device 10 is configured to include a signal distribution unit 11, a first signal combination unit 12a, a second signal combination unit 12b, a third signal combination unit 12c, a fourth signal combination unit 12d, a fifth signal combination unit 12e, and a signal switching unit 13.

The signal distribution unit 11 copies the downlink signal by the number of radio devices 30 at the functional splitting point corresponding to the downlink signal, and distributes the downlink signals to the radio devices 30 corresponding to the functional splitting point corresponding to the downlink signal.

In the present embodiment, as an example, the relay device 10 is provided with the five signal combination units that are the first signal combination unit 12a, the second signal combination unit 12b, the third signal combination unit 12c, the fourth signal combination unit 12d, and the fifth signal combination unit 12e. Note that, in the following description, the first signal combination unit 12a, the second signal combination unit 12b, the third signal combination unit 12c, the fourth signal combination unit 12d, and the fifth signal combination unit 12e will be simply referred to as a "signal combination unit 12" when they do not need to be distinguished from each other. Nate that the number of signal combination units 12 is not limited to five, and may be any number more than one corresponding to the number of functional splitting points.

The signal combination unit 12 converts signal data of the uplink signal received from each radio device 30 on the basis of a prescribed signal format. The relay device 10 is provided with a plurality of the signal combination units 12 the number of which corresponds to the number of functional splitting points for functional split between the radio control apparatus 20 and the radio devices 30.

The signal switching unit 13 acquires the uplink signal transmitted from each radio device 30. The signal switching unit 13 selects the signal combination unit 12 supporting the functional splitting point corresponding to the radio device 30 that has output the uplink signal. The signal switching unit 13 performs switching to use the selected signal combination unit 12.

Configuration of First Signal Combination Unit

Figure 4:
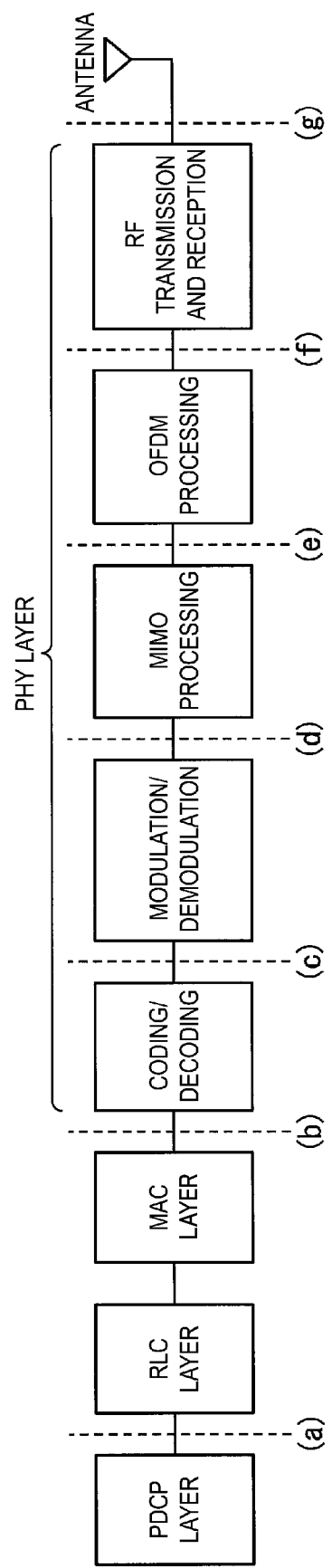
FIG. 4 is a diagram illustrating an example of functional splitting points for functional split between a radio control apparatus and a radio device.

The first signal combination unit 12a is selected by the signal switching unit 13 when the functional splitting point is (g) in FIG. 4. The first signal combination unit 12a performs signal combination by adding analog waveforms of radio signals.

The first signal combination unit 12a of the relay device 10 adds analog waveform signal data pieces at the same timing, among analog waveform signal data pieces transmitted from the respective radio devices 30, without changing them from the analog information. Then, the relay device 10 transmits the analog waveform signal data as a result of the adding by the first signal combination unit 12a, to the radio control apparatus 20. Thus, the radio control apparatus 20 can acquire the analog waveform signal data obtained by the adding by the first signal combination unit 12a, and execute signal processing assigned to the radio control apparatus 20.

Note that the first signal combination unit 12a used when the functional splitting point is (g) in FIG. 4 may be configured to perform signal combination by adding digital waveform signal data pieces of radio signals.

In this case, the digital waveform signal data is transmitted from each radio device 30 to the relay device 10 as packet data a typical example of which includes an Ethernet (trade name) frame. The first signal combination unit 12a of the relay device 10 extracts, from a payload of the frame, digital waveform signal data pieces at the same timing among digital waveform signal data pieces transmitted from the respective radio devices 30, and adds the extracted signal data pieces into a single frame. Then, the relay device 10 transmits the frame as a result of adding a plurality of digital waveform signal data pieces to the radio control apparatus 20. Thus, the radio control apparatus 20 can acquire the digital waveform signal data obtained by the adding by the first signal combination unit 12a, and execute signal processing assigned to the radio control apparatus 20.

Configuration of Second Signal Combination Unit

The second signal combination unit 12b is selected by the signal switching unit 13 when the functional splitting point is (f) in FIG. 4. The second signal combination unit 12b performs signal combination by adding IQ data pieces in the time domain transmitted using CPRI signals.

The second signal combination unit 12b of the relay device 10 extracts, from a payload of the frame, IQ data pieces at the same timing among IQ data pieces in the time domain transmitted from the respective radio devices 30, and adds the extracted IQ data pieces into a single frame. Then, the relay device 10 transmits the frame as a result of adding the IQ data pieces in the time domain by the second signal combination unit 12b, to the radio control apparatus 20. Thus, the radio control apparatus 20 can acquire the IQ data in the time domain obtained by the adding by the second signal combination unit 12b, and execute signal processing assigned to the radio control apparatus 20.

Configuration of Third Signal Combination Unit

The third signal combination unit 12c is selected by the signal switching unit 13 when the functional splitting point is (d) or (e) in FIG. 4. The third signal combination unit 12c performs signal combination by adding IQ data pieces in the frequency domain.

The third signal combination unit 12c of the relay device 10 extracts, from a payload of the frame, IQ data pieces at the same timing among IQ data pieces in the frequency domain transmitted from the respective radio devices 30, and adds the extracted IQ data pieces into a single frame. Then, the relay device 10 transmits the frame as a result of adding the IQ data pieces in the frequency domain by the third signal combination unit 12c, to the radio control apparatus 20. Thus, the radio control apparatus 20 can acquire the IQ data in the frequency domain obtained by the adding by the third signal combination unit 12c, and execute signal processing assigned to the radio control apparatus 20.

Note that the third signal combination unit 12c used when the functional splitting point is (d) or (e) in FIG. 4 may be configured to perform joint detection of the radio signals transmitted from terminals on the basis of the IQ data pieces in the frequency domain received from the plurality of radio devices 30.

Also in this case, the third signal combination unit 12c of the relay device 10 extracts, from a payload of the frame, IQ data pieces at the same timing among IQ data pieces in the frequency domain transmitted from the respective radio devices 30 as described above. However, in this case, the relay device 10 performs joint detection using the extracted IQ data pieces, instead of adding the IQ data pieces extracted, to form a single frame. Then, the relay device 10 transmits the frame to the radio control apparatus 20. Thus, the radio control apparatus 20 can acquire the radio signal selected by the third signal combination unit 12c, and execute signal processing assigned to the radio control apparatus 20.

An example of a method for joint detection of the radio signals transmitted from the terminal may include a method in which the relay device 10 performs probability calculation using IQ data pieces in the frequency domain transmitted from a plurality of radio devices 30, and selects a signal achieving the highest posterior probability among candidate signal transmitted.

Configuration of Fourth Signal Combination Unit

The fourth signal combination unit 12d is selected by the signal switching unit 13 when the functional splitting point is (c) in FIG. 4. The fourth signal combination unit 12d performs signal combination by adding likelihood data pieces. As in the case of the IQ data described above, the likelihood data is transmitted from each the radio device 30 to the relay device 10 as packet data a typical example of which including an Ethernet (trade name) frame. The fourth signal combination unit 12d of the relay device 10 extracts, from a payload of the frame, likelihood data pieces at the same timing among likelihood data pieces transmitted from the respective radio devices 30, and adds the likelihood data pieces into a single frame. Then, the relay device 10 transmits a frame as a result of adding a plurality of likelihood data pieces to the radio control apparatus 20. Thus, the radio control apparatus 20 can acquire the likelihood data obtained by the adding by the fourth signal combination unit 12d, and execute signal processing assigned to the radio control apparatus 20.

Configuration of the Fifth Signal Combination Unit

The fifth signal combination unit 12e is selected by the signal switching unit 13 when the functional splitting point is (a) or (b) in FIG. 4. The fifth signal combination unit 12e selects any one of bit data pieces received from the plurality of radio devices 30 on the basis of frame header information (control information).

In this case, for example, the relay device 10 refers to a header value to select a frame with the header value not disabled, instead of extracting and adding bit data pieces at the same timing from the payload of the frame, among the bit data pieces transmitted from the radio devices 30. Then, the relay device 10 discards the frames other than the selected frame. Alternatively, when there are frames with sequence numbers of header values overlapping for example, the relay device 10 may select only one of the overlapping frames and may discard frames other than the selected frame. Thus, the radio control apparatus 20 can receive the frame selected by the fifth signal combination unit 12e, and execute signal processing assigned to the radio control apparatus 20.

Note that the fifth signal combination unit 12e used in a when the functional splitting point is (a) or (b) in FIG. 4 may be configured to select any one of the bit data pieces transmitted from the plurality of radio devices 30 on the basis of information on a control signal.

In this case, the fifth signal combination unit 12e selects one frame on the basis of the control signal transmitted and received between the radio device 30 and the radio control apparatus 20 instead of extracting and adding bit data pieces at the same timing from the payload of the frame. Then, the relay device 10 discards the frames other than the selected frame. Thus, the radio control apparatus 20 can receive the frame selected by the fifth signal combination unit 12e, and execute signal processing assigned to the radio control apparatus 20.

Examples of the Control Signal thus used as a Reference Include Reference Signal Received Power (RSRP) of a Measurement Report and the like.

Note that the plurality of signal combination units 12 having the different functions described above may be used concurrently. In this case, the signal switching unit 13 sorts and outputs signals to the plurality of signal combination units 12 in accordance with a functional splitting point corresponding to the connected radio device 30.

Note that the signal distribution unit 11, the plurality of signal combination units 12, and the signal switching unit 13 of the relay device 10 may be implemented by dedicated hardware or may be implemented by software on a general-purpose hardware.

Operation of Relay Device

An example of an operation performed by the relay device 10 will be described below.

Figure 2:
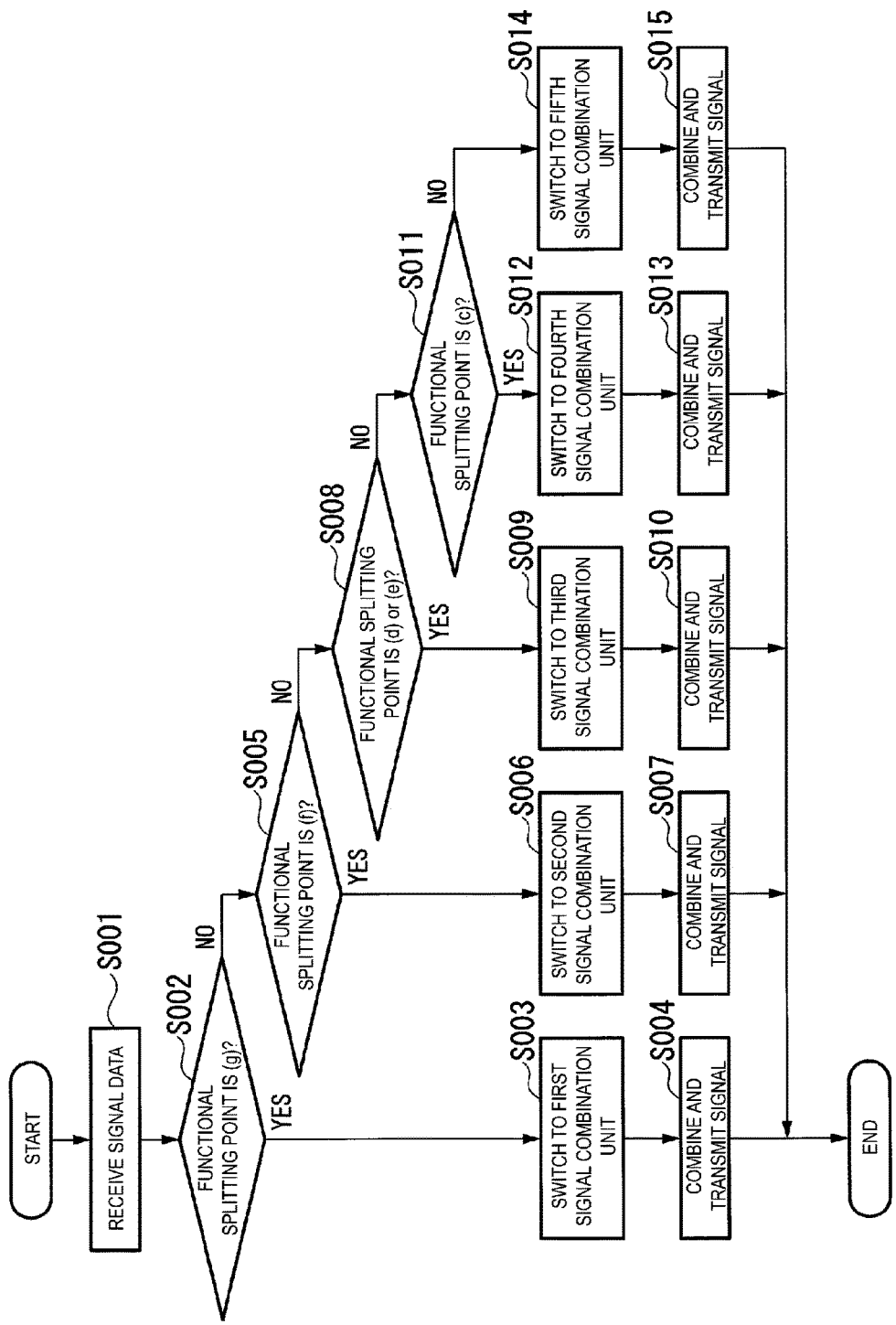
FIG. 2 is a flowchart illustrating an operation performed by a relay device 10 of the distributed antenna system 1 according to one embodiment of the present invention.
Figure 3:
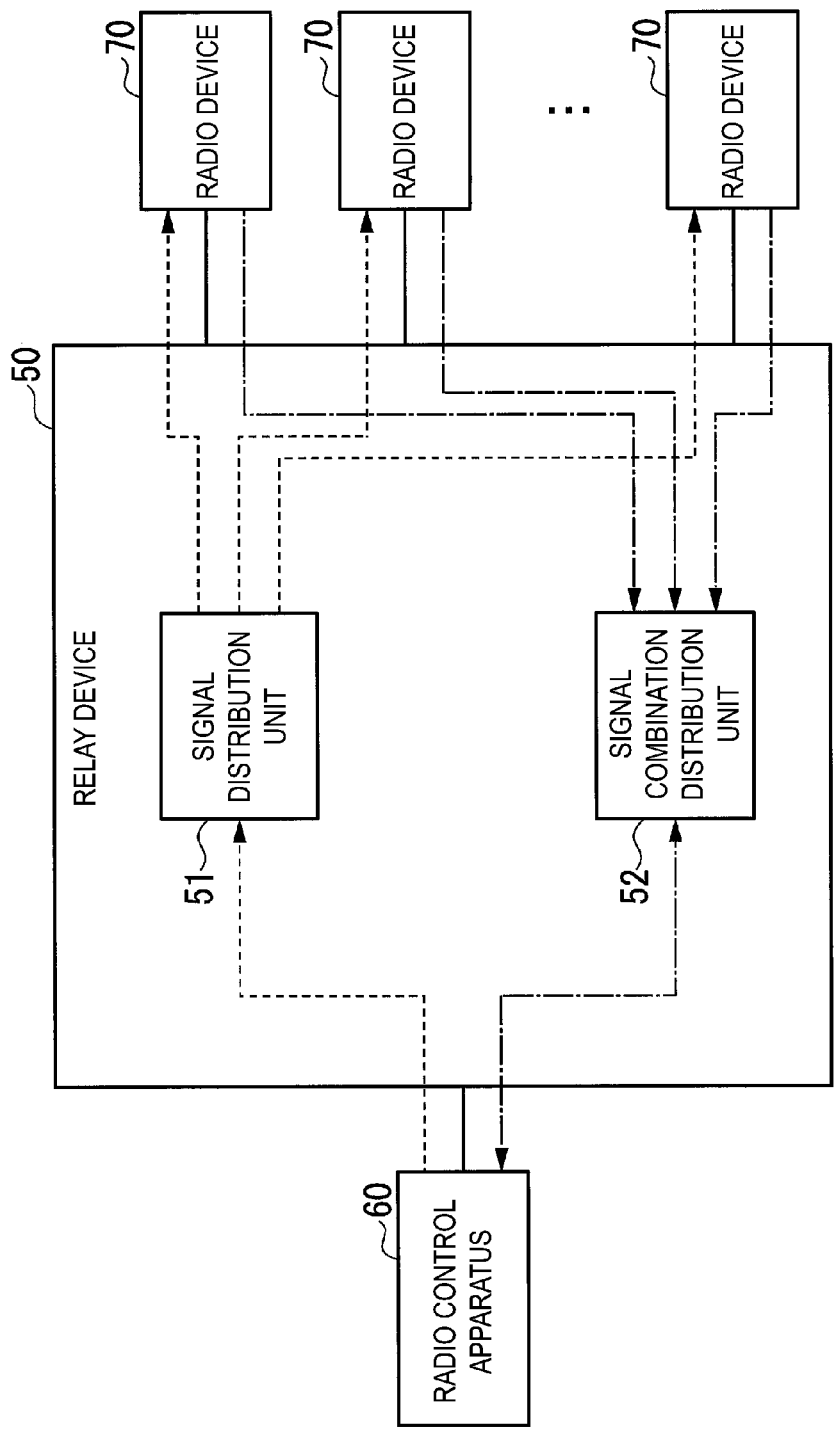
FIG. 3 is a block diagram illustrating a configuration of a related-art distributed antenna system.

FIG. 2 is a flowchart illustrating an operation performed by the relay device 10 of the distributed antenna system 1 according to an embodiment of the present invention.

The signal switching unit 13 receives the signal data of the uplink signal transmitted from each radio device 30 (step S001). The signal switching unit 13 identifies the radio device 30 that has transmitted the uplink signal.

When the functional splitting point corresponding to the identified radio device 30 is the functional splitting point (g) in FIG. 4 (Yes in step S002), the signal switching unit 13 performs switching such that the first signal combination unit 12a is used (step S003). The signal switching unit 13 outputs the signal data of the uplink signal transmitted from each radio device 30 to the first signal combination unit 12a. The first signal combination unit 12a combines the plurality of input signal data pieces. The first signal combination unit 12a transmits the combined signal data to the radio control apparatus 20 (step S004).

When the functional splitting point corresponding to the identified radio device 30 is the functional splitting point (f)

in FIG. 4 (Yes in step S005), the signal switching unit 13 performs switching such that the second signal combination unit 12b is used (step S006). The signal switching unit 13 outputs the signal data of the uplink signal transmitted from each radio device 30 to the second signal combination unit 12b.

The second signal combination unit 12b combines the plurality of input signal data pieces. The second signal combination unit 12b transmits the combined signal data to the radio control apparatus 20 (step S007).

When the functional splitting point corresponding to the identified radio device 30 is the functional splitting point (d) or (e) in FIG. 4 (Yes in step S008), the signal switching unit 13 performs switching such that the third signal combination unit 12c is used (step S009). The signal switching unit 13 outputs the signal data of the uplink signal transmitted from each radio device 30 to the third signal combination unit 12c.

The third signal combination unit 12c combines the plurality of input signal data pieces. The third signal combination unit 12c transmits the combined signal data to the radio control apparatus 20 (step S010).

When the functional splitting point corresponding to the identified radio device 30 is the functional splitting point (c) in FIG. 4 (Yes in step S011), the signal switching unit 13 performs switching such that the fourth signal combination unit 12d is used (step S012). The signal switching unit 13 outputs the signal data of the uplink signal transmitted from each radio device 30 to the fourth signal combination unit 12d.

The fourth signal combination unit 12d combines the plurality of input signal data pieces. The fourth signal combination unit 12d transmits the combined signal data to the radio control apparatus 20 (step S013).

When the functional splitting point corresponding to the identified radio device 30 is none of the functional splitting points (c) to (g) in FIG. 4, in other words, when the functional splitting point corresponding to the identified radio device 30 is the functional splitting point (a) or (b) in FIG. 4 (No in step S011), the signal switching unit 13 performs switching such that the fifth signal combination unit 12e is used (step S014). The signal switching unit 13 outputs the signal data of the uplink signal transmitted from each radio device 30 to the fifth signal combination unit 12e. The fifth signal combination unit 12e combines the plurality of input signal data pieces. The fifth signal combination unit 12e transmits the combined signal data to the radio control apparatus 20 (step S015).

Then, the processing in the flowchart illustrated in FIG. 2 is terminated.

As described above, in the relay device 50 of the related-art distributed antenna system can only distribute/combine CPRI signals or RF signals, and thus cannot distribute/combine signals transmitted between the radio control apparatus 60 and the radio device 70 using new functional splitting points as a result of the redefinition of the functional split between the radio control apparatus 60 and the radio device 70. Furthermore, separate devices such as the relay device 50 that distributes/combines the CPRI signals or the relay device 50 that distributes/combines the RF signals need to be prepared for different functional splitting points. Thus, there has been an issue that a large device cost related to operation of the relay device 50 or a large workload related to replacement of the relay device 50 is required.

In contrast, in the above-described distributed antenna system 1 according to an embodiment of the present invention, an operating mode for distributing/combining signals transmitted between the radio control apparatus 20 and the radio device 30 can be switched by the signal switching unit 13 in the relay device 10. Thus, the distributed antenna system 1 enables a single relay device 10 to distribute/combine signal data corresponding to a signal format based on functional split between a radio control apparatus 20 and a radio device 30. As a result, since it is not necessary to prepare a separate relay device according to the functional splitting point, the distributed antenna system 1 can reduce the equipment cost involved in the operation of the relay device 50 and the work burden on replacing the relay device 50.

Although the embodiment of the present invention has been described above with reference to the drawings, it is clear that the above embodiment is merely an example of the present invention, and the present invention is not limited to the embodiment described above. Thus, addition, omission, substitution, and other modifications of the constituent components may be made without departing from the spirit and scope of the present invention.

The relay device 10 in the above-described embodiment may be implemented by a computer. In such a case, the control apparatus and the wireless communication apparatuses may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a Field Programmable Gate Array (FPGA).

Reference Signs List

1 Distributed antenna system
10 Relay device (relay apparatus)
11 Signal distribution unit
12 Signal combination unit
13 Signal switching unit
20 Radio control apparatus
30 Radio device
50 Relay device (relay apparatus)
51 Signal distribution unit
52 Signal combination unit
60 Radio control apparatus
70 Radio device

The invention claimed is:

1. A relay device for relaying communications between a plurality of radio devices that perform radio communications with a terminal and a radio control apparatus that controls the plurality of radio devices, the relay device comprising:
   a plurality of signal combiners that are each provided for one of functional splitting points between the plurality of radio devices and the radio control apparatus, and are each configured to convert signal data outputted from a signal switcher based on a signal format in accordance with the one of the functional splitting points, and transmit the converted signal data to the radio control apparatus,
   wherein the signal switcher is configured to output the signal data transmitted from the one of the plurality of radio devices, to one of the plurality of signal combiners supporting one of the functional splitting points that corresponds to the one of the plurality of radio devices,
   wherein the functional splitting point is a splitting point in a protocol stack including a plurality of layers composed of one or more functions, when functions at and above either layer or function are assigned to the radio control apparatus, and functions below said layer or function are assigned to the radio devices,
   wherein one functional splitting point is set in the protocol stack, and
   wherein the plurality of signal combiners are provided corresponding to a plurality of protocol stacks in which different functional splitting points are set therein.

2. The relay device according to claim 1, wherein the converted signal data is first signal data obtained by adding a plurality of pieces of the signal data, second signal data obtained by selecting one of the plurality of pieces of the signal data, or third signal data indicating a signal transmitted from the terminal detected in accordance with the plurality of pieces of the signal data.

3. The relay device according to claim 2, wherein the second signal data is signal data selected in accordance with control information included in signals transmitted from the plurality of radio devices.

4. The relay device according to claim 2, wherein the second signal data is signal data selected in accordance with a control signal transmitted and received between the radio devices and the radio control apparatus.

5. A relay device for relaying communications between a plurality of radio devices that perform radio communications with a terminal and a radio control apparatus that controls the plurality of radio devices, the relay device comprising:
   a plurality of signal combiners that are each provided for one of functional splitting points between the plurality of radio devices and the radio control apparatus, and are each configured to convert signal data outputted from a signal switcher based on a signal format in accordance with the one of the functional splitting points and transmit the converted signal data to the radio control apparatus;
   wherein the signal switcher is configured to output a plurality of pieces of the signal data transmitted from the plurality of radio devices respectively, to the plurality of signal combiners supporting the functional splitting points that correspond to the plurality of radio devices that transmitted the signal data respectively,
   wherein the functional splitting point is a splitting point in a protocol stack including a plurality of layers composed of one or more functions, when functions at and above either layer or function are assigned to the radio control apparatus, and functions below said layer or function are assigned to the radio devices,
   wherein one functional splitting point is set in the protocol stack, and
   wherein the plurality of signal combiners are provided corresponding to a plurality of protocol stacks in which different functional splitting points are set therein.

6. The relay device according to claim 5, wherein the converted signal data is first signal data obtained by adding the plurality of pieces of the signal data, second signal data obtained by selecting one of the plurality of pieces of the signal data, or third signal data indicating a signal transmitted from the terminal detected in accordance with the plurality of pieces of the signal data.

7. The relay device according to claim 6, wherein the second signal data is signal data selected in accordance with control information included in signals transmitted from the plurality of radio devices.

8. The relay device according to claim 6, wherein the second signal data is signal data selected in accordance with a control signal transmitted and received between the radio devices and the radio control apparatus.

9. The relay device according to claim 5, wherein the relay device further comprises a signal distributer configured to copy signal data transmitted from the radio control apparatus, and transmit the copied signal data to only a target radio device of the plurality of the radio devices in accordance with the functional splitting point.

10. A relay device for relaying communications between a plurality of radio devices that perform radio communications with a terminal and a radio control apparatus that controls the radio devices, the relay device comprising a signal distributer configured to copy signal data transmitted from the radio control apparatus, and transmit the copied signal data to only a target radio device of the plurality of the radio devices in accordance with a functional splitting point,
   wherein the functional splitting point is a splitting point in a protocol stack including a plurality of layers composed of one or more functions, when functions at and above either layer or function are assigned to the radio control apparatus, and functions below said layer or function are assigned to the radio devices; and
   wherein one functional splitting point is set in the protocol stack.

11. A computer-implemented relay method for relaying communications between a plurality of radio devices that perform radio communications with a terminal and a radio control apparatus that controls the plurality of radio devices, the method comprising:
   converting, by a plurality of signal combiners that are each provided for one of functional splitting points between the plurality of radio devices and the radio control apparatus, signal data outputted from a signal switcher based on a signal format in accordance with the one of the functional splitting points;
   transmitting, by the plurality of signal combiners, the converted signal data to the radio control apparatus; and
   outputting, by the signal switcher, the signal data transmitted from the one of the plurality of radio devices, to one of the plurality of signal combiners supporting one of the functional splitting points that corresponds to the one of the plurality of radio devices,
   wherein the functional splitting point is a splitting point in a protocol stack including a plurality of layers composed of one or more functions, when functions at and above either layer or function are assigned to the radio control apparatus, and functions below said layer or function are assigned to the radio devices, wherein one functional splitting point is set in the protocol stack, and wherein the plurality of signal combiners are provided corresponding to a plurality of protocol stacks in which different functional splitting points are set therein.

12. A computer-implemented relay method for relaying communications between a plurality of radio devices that perform radio communications with a terminal and a radio control apparatus that controls the plurality of radio devices, the method comprising:

converting, by a plurality of signal combiners that are each provided for one of functional splitting points between the plurality of radio devices and the radio control apparatus, signal data outputted from a signal switcher based on a signal format in accordance with the one of the functional splitting points;

transmitting, by the plurality of signal combiners, the converted signal data to the radio control apparatus; and outputting, by the signal switcher, a plurality of pieces of the signal data transmitted from the plurality of radio devices respectively, to the plurality of signal combiners supporting the functional splitting points that correspond to the plurality of radio devices that transmitted the signal data respectively, wherein the functional splitting point is a splitting point in a protocol stack including a plurality of layers composed of one or more functions, when functions at and above either layer or function are assigned to the radio control apparatus, and functions below said layer or function are assigned to the radio devices, wherein one functional splitting point is set in the protocol stack, and wherein the plurality of signal combiners are provided corresponding to a plurality of protocol stacks in which different functional splitting points are set therein.

* * * * *